United States Patent

Volberg

[15] 3,688,309
[45] Aug. 29, 1972

[54] DEVICE FOR DETECTING AND DISPLAYING THE RESPONSE OF A TISSUE TO STIMULI

[72] Inventor: Herman W. Volberg, P.O. Box 125, Oahu, Hawaii 96734

[22] Filed: Sept. 9, 1970

[21] Appl. No.: 70,702

[52] U.S. Cl. ............... 340/421, 73/73, 324/61 M, 324/65 M, 340/233, 340/235, 340/384 E
[51] Int. Cl. .......................................... G08b 21/00
[58] Field of Search. 340/235, 421, 384 E; 324/61 M, 324/65 R, 65 M; 73/73

[56] References Cited

UNITED STATES PATENTS

| 2,812,757 | 11/1957 | Lusk et al. | 340/235 UX |
| 3,493,950 | 2/1970 | Lind | 324/65 X |
| 3,531,684 | 9/1970 | Nuckolls | 340/235 UX |
| 3,284,796 | 11/1966 | Borsattino et al. | 340/384 E |
| 2,929,241 | 3/1960 | Gebhart | 324/61 M |
| 1,690,279 | 11/1928 | Craft | 340/261 X |
| 3,197,699 | 7/1965 | Johansen | 324/61 M |
| 3,221,317 | 11/1965 | Ferrigno | 340/235 X |
| 3,331,020 | 7/1967 | Farenkopf | 324/65 R |
| 3,494,196 | 2/1970 | Moussette | 340/228 X |

FOREIGN PATENTS OR APPLICATIONS

| 124,171 | 1959 | U.S.S.R. | 324/65 M |

*Primary Examiner*—David L. Trafton
*Attorney*—Owen, Wickersham and Erickson

[57] ABSTRACT

A tissue electrochemical response detector includes a probe input electrically engaging the tissue, a detector circuit, and an output device. Changes in the probe impedance due to electrochemical variations in the tissue are sensed by the detector circuit and an audible or visible signal indicative of the variation is supplied by the output device.

11 Claims, 5 Drawing Figures

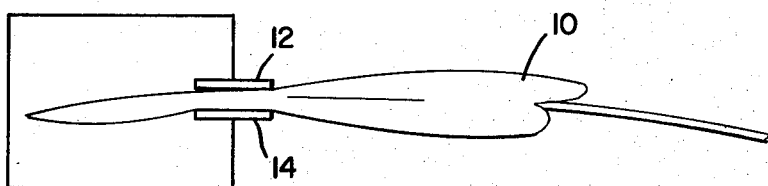
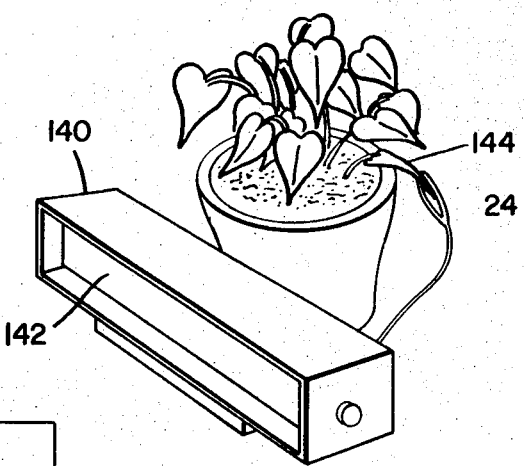
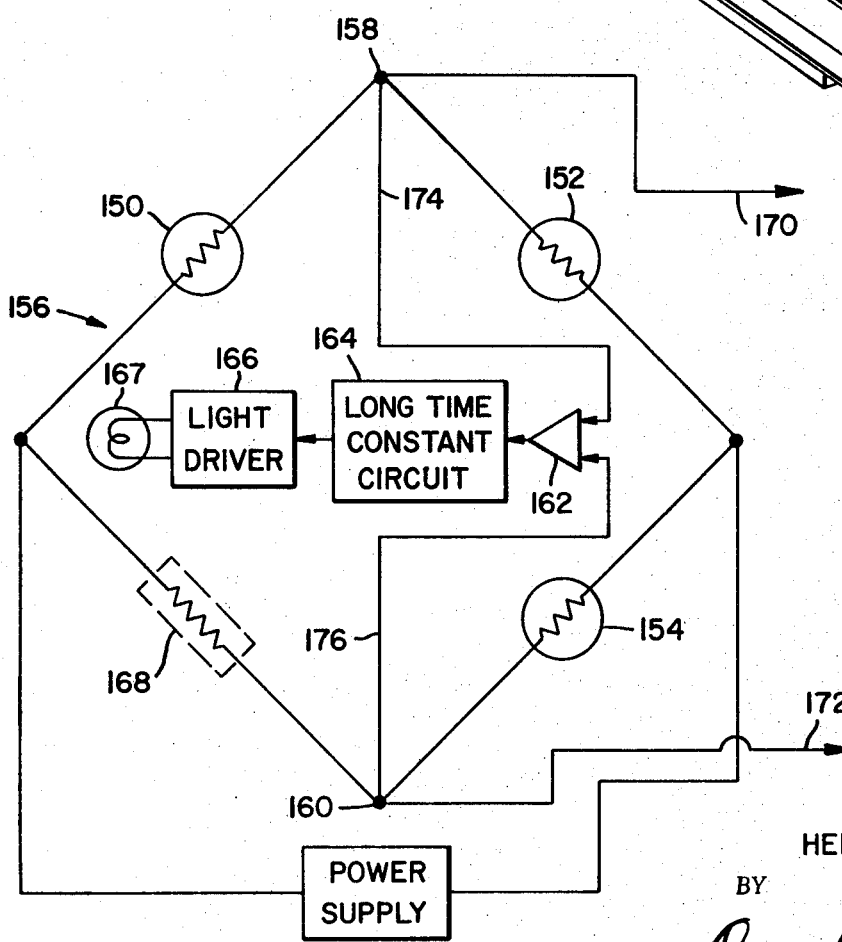

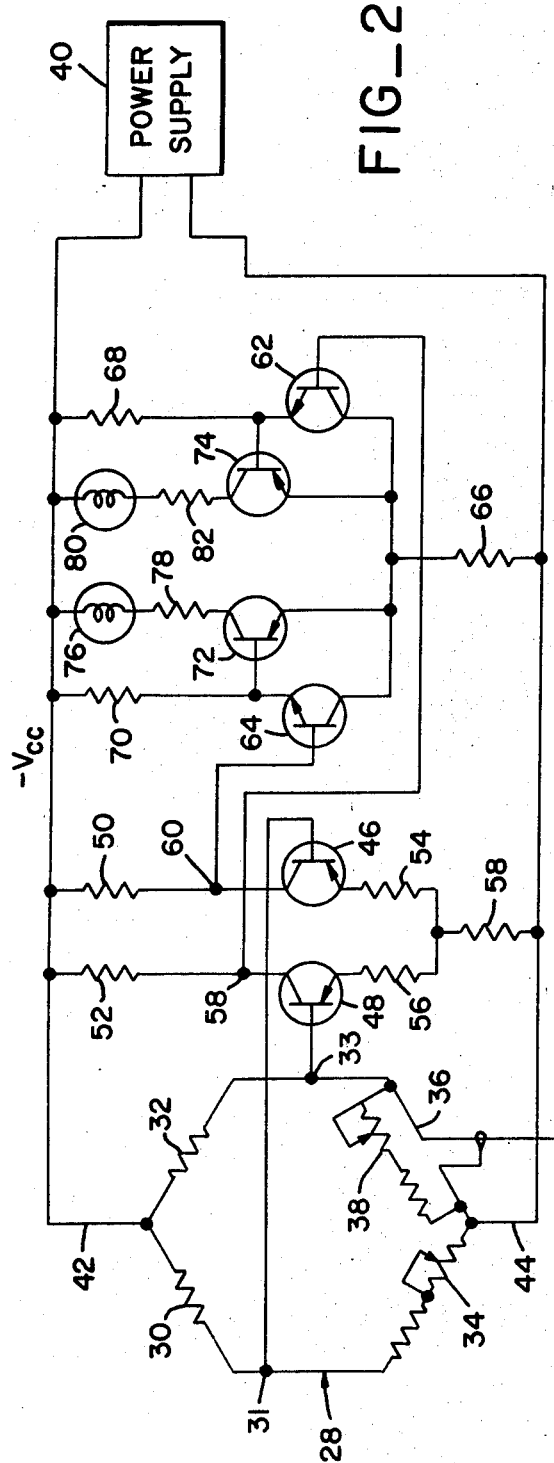
FIG_2
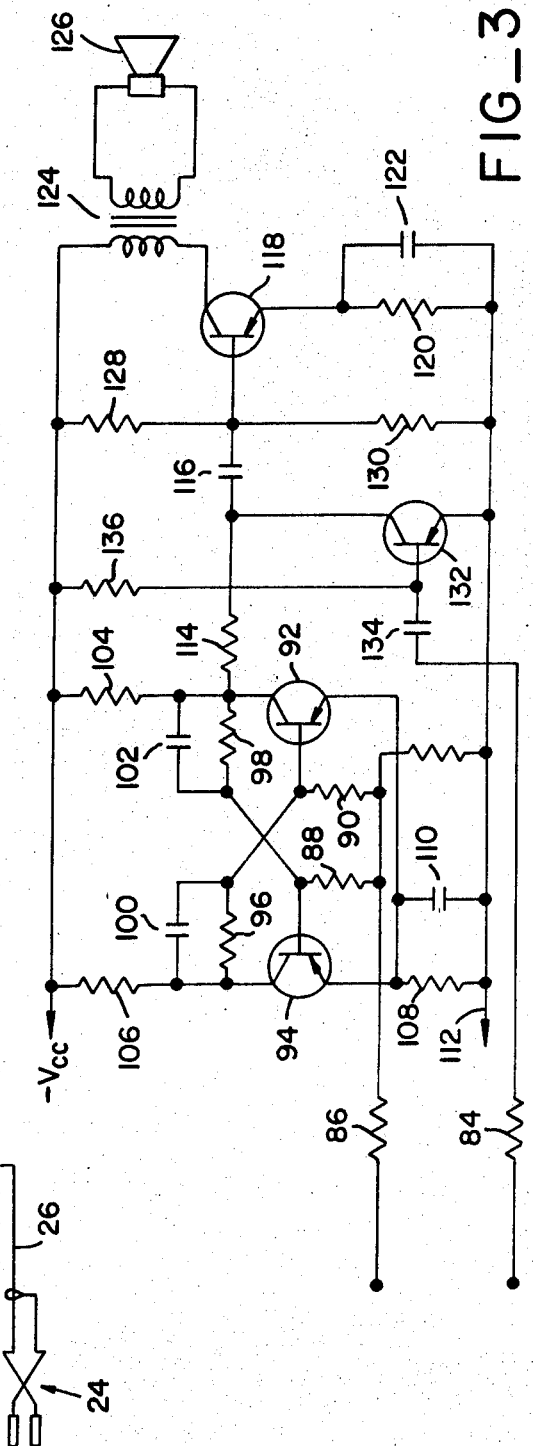
FIG_3
INVENTOR.
HERMAN W. VOLBERG
BY
Owen, Wickersham & Erickson
ATTORNEYS

DEVICE FOR DETECTING AND DISPLAYING THE RESPONSE OF A TISSUE TO STIMULI

BACKGROUND OF THE INVENTION

The present invention relates generally to detectors and more particularly to a biological detector capable of sensing electrochemical variations in tissue and supplying an output indicative thereof. In connection with the study of biological organisms there is often a need to look at changes in the electrochemical status of a particular tissue. For example, work has been done recently to determine if plants are able to perceive, feel emotion and the like by studying changes in the electrochemical status of some tissue of the plant as a result of external stimulation. However, it is a problem to accurately determine changes in the electrochemical status of plant. This is aggravated by the necessity of distinguishing between electrochemical changes and changes in ambient conditions. Thus it is an object of this invention to provide a solution to the foregoing problem.

It is a further object of this invention to provide a device for accurately detecting variations in the electrochemical status of tissue.

It is another object of this invention to provide a device that will provide a visual output indicative of changes in the electrochemical status of plants.

It is yet another object of this invention to provide a device capable of supplying an audible output indicative of changes in the electrochemical status of plants.

Finally, it is an object of this invention to provide a device capable of distinguishing between changes in electrochemical status and changes in ambient conditons.

SUMMARY OF THE INVENTION

These and other objects of the invention are achieved by a detector device that is electrically connected to a tissue of interest and that provides an output indicative of any electrochemical variations therein. A sensor element electrically engages the tissue and is communicable with the input to a detector circuit designed to generate an electrical signal related to any change in the electrochemical status of the tissue. The electrical signal in turn stimulates an output device that supplies either an audible and/or visual indication of any change in electrochemical status.

According to another aspect of the invention, the detector circuit is made adjustable to compensate for relatively low frequency changes in the ambient conditions, and means may be connected to the detector circuit for making adjustments automatically.

Finally, the invention, includes several specific circuits as preferred embodiments.

BRIEF DESCRIPTION OF THE DRAWING

FIG. 1 is a block diagram illustrating the functional organization of the invention;

FIG. 2 is a circuit diagram of a preferred embodiment of the invention with a visual output;

FIG. 3 is a circuit diagram of an alternative embodiment of the invention having an audible output;

FIG. 4 is an elevational view of how one embodiment of the invention might look when applied to a plant; and FIG. 5 is a circuit diagram of an automatic compensation scheme.

DESCRIPTION OF THE PREFERRED EMBODIMENTS

The basic conceptual framework of the invention is illustrated in FIG. 1. There, a leaf 10 is electrically contacted by a sensor consisting in this case of two flat plate electrodes 12 and 14 that are in turn connected via coaxial cable 16 to a detector 18. Variations in the electrochemical status of leaf 10 appear at detector 18 as a change in the impedance of electrodes 12 and 14. When an electrochemical change has occurred, a small signal is generated in response thereto by detector 18 and is transmitted to amplifier 20. The amplified signal then stimulates an output device 22 which informs the human agency of the electrochemical change. Output devices may take the form of a graph, meter, lights, audible sound generator or other like devices. This invention is applicable to any biological organism eliciting electrochemical responses to stimuli.

In applying electrodes 12 and 14 to a leaf, it is helpful to first blot away excessive moisture and then to insert a piece of sterile gauze impregnated with agar-agar gelatin between each electrode and the leaf. This practice avoids shunting effects, cushions the contact, and reduces the leaf-to-electrode resistance.

A more detailed embodiment of the invention is shown in FIG. 2 where a clip-on probe 24 is used to electrically engage the tissue of interest. A coaxial cable 26 connects probe 24 to a bridge circuit 28 having fixed impedance legs 30 and 32, variable impedance leg 34, and the unknown impedance leg 36. For adjusting the sensitivity of the circuit, variable resistance 38 is in parallel with the unknown impedance. Power is supplied to bridge 28 from a dc power supply 40 via leads 42 and 44.

Points 31 and 33 may be considered the output of bridge 28 and are connected respectively to the gates of PNP transistors 46 and 48. The collectors of transistors 46 and 48 are connected through resistors 50 and 52 respectively to the negative side of power supply 40. The emitters of transistors 46 and 48 are connected via thermal stabilization resistors 54, 56, and 58 to the positive side of power supply 40. Transistors 46 and 48 form a first stage in the amplification circuitry. The outputs therefrom are taken at points 58 and 60 and are connected respectively to the bases of NPN transistors 62 and 64. Resistor 66 interconnects the positive side of power supply 40 with the common collector of transistors 62 and 64, while resistors 68 and 70 respectively connect the emitters thereof to the negative side of power supply 40. The emitters of transistors 62 and 64 and are also connected respectively to the bases of PNP transistors 72 and 74 which form the final stage of amplification. Connected between the collectors of the latter transistors and the negative side of power supply 40 are light source 76 and resistor 78 and light source 80 and resistor 82, respectively, completing the circuit connections. Transistors 72 and 74 have a common emitter connected through resistor 66 to the positive side of power supply 40.

Transistors 46, 64, and 72 are complementarily coupled in cascade and drive light source 76 with a voltage proportional to that at point 31. Amplifiers 48, 62, and 74 are also complementarily coupled in cascade and drive light source 80 with a voltage proportional to that at point 33.

In operation, clip probe 24 is electrically attached to a tissue of interest. Variable resistor 34 is then adjusted to balance bridge 28 so that the voltage level at points 31 and 33 are the same. Bridge sensitivity is enhanced by adjusting variable resistance 38 to make the total impedance of leg 36 approximately equal to that in each of the remaining legs.

After the bridge is balanced and before any change in electrochemical status has occurred in the tissue, the voltage levels at points 31 and 33 will be exactly the same and consequently the voltages applied to light sources 76 and 80 will be as close to the same as the transistors are well matched. Thus, before a change in electrochemical status, the light intensity emitted from sources 76 and 80 will be very nearly the same. When an electrochemical change in the tissue occurs, the impedance between the electrodes of probe 24 will either decrease or increase depending on the nature of the electrochemical change. AS a result, bridge 28 becomes unbalanced so that points 31 and 33 will have different voltage levels. After amplification, this difference appears as a difference in intensity of light sources 76 and 80. The direction in which the impedance of probe 24 changes determines which light source will increase in intensity. As an optional feature, light sources 76 and 80 may be of different colors so that detected electrochemical changes are more noticeable.

FIG. 3 illustrates an alternative embodiment of the invention having an output portion that generates an audible signal indicative of electrochemical changes. In FIG. 3 resistors 84 and 86 are connected respectively to the collectors of transistors 72 and 74 of FIG. 2. Resistor 86 is connected through resistors 88 and 90 to the bases of transistors 92 and 94 respectively. A cross coupling network consisting of resistors 96 and 98 and capacitors 100 and 102 interconnect the collector of one transistor with the base of the other and vice versa. Resistors 104 and 106 interconnect a negative source of power with the collectors of transistors 92 and 94 respectively, and the parallel combination of resistor 108 and capacitor 110 interconnect the common emitters of transistors 92 and 94 with a positive source of power 112 (the positive side of power supply 40) and function as a temperature stabilizing network.

Transistors 92 and 94 and their associated passive elements form a multivibrator having a frequency of oscillation proportional to the voltage level applied through resistors 88 and 90. Thus, the frequency at which the multivibrator oscillates is proportional to the voltage level at point 33 and will vary up or down in accordance with the electrochemical status of the tissue.

The output of the multivibrator circuit is supplied through resistor 114 and capacitor 116 to the base of PNP transistor 118. The parallel combination of a temperature stability resistor 120 and a by-pass capacitor 122 interconnect the emitter of transistor 118 with positive power supply 112. The collector of transistor 118 is coupled through transformer 124 to a speaker 126. Resistors 128 and 130 form a voltage divider for biasing the base of transistor 118. In operation, transistor 118 functions as an audio amplifier, supplying the final stage of audio power to speaker 126. Thus, the multivibrator, audio amplifier and speaker combine to generate an audible signal whose frequency change indicates electrochemical changes in the plant.

Transistor 132 has its collector coupled to the common point between resistor 114 and a capacitor 116 and its emitter coupled to the positive source of power supply 112. The base of transistor 132 is coupled via resistor 136 to the negative source of power and RC coupled via capacitor 134 and resistor 84 to the collector of transistor 72 (of FIG. 2). Transistor 132 operates as a transient amplitude gate blocking the audio output from transistor 92 until it is enabled by a signal indicative of a change in the electrochemical status of the tissue. That is, so long as the voltage level at point 31 of bridge 28 is stable, transistor 132 will be biased into conduction via resistor 136, and capacitor 134 will block the dc signal coming from point 31. The result is that transistor 118 is shunted and consequently no audio signal is heard. However, any change in the voltage at point 31 will be communicated through capacitor 134 to turn off transistor 132 for some period of time determined by the RC time constant of resistor 84 and capacitor 134. During this time, the audio signal, which will be changing, may be heard. Although an optional feature, transient amplitude gate 132 avoids a possibly undesirable constant tone output. An audible signal would be heard only during changes in the electrochemical status of the tissue.

FIG. 4 illustrates the invention used for entertainment or decorative purposes. The circuitry is housed in a cabinet 140 having a transluscent front panel 142. Probe 24 is attached to the leaf of a plant 144 in planter 146. Panel 142 may be white or have colored sections that are illuminated by light sources 76 and 80 (FIG. 2) to indicate changes in resistivity. For example, one half of panel 142 might provide a red light and the other half a green light. Changes in relative brightness of the two colors can be related to plant well-being and may also provide interesting entertainment. To further enhance the enjoyment of the invention, both a visual and audio output could be employed simply by combining the circuitry of FIGS. 2 and 3.

As mentioned previously, low frequency changes in impedance of probe 24 may be caused by external factors such as ambient humidity or temperature. These changes can have amplitudes large enough to unbalance the bridge to a point where it is no longer sensitive to subtle changes in the electrochemistry of the plant. However, it has been observed that the changes due to external influence occur over relatively long periods of time as compared with changes in the electrochemical status of a tissue. For example, most variations due to external factors take at least one minute and often much longer whereas variations of interest occur over much shorter time intervals.

By taking advantage of the differences in time over which the two types of changes occur and by making the bridge impedance adjustable, it is possible to maintain maximum bridge sensitivity either manually or automatically.

FIG. 5 illustrates one way of automatically maintaining maximum sensitivity. There, components whose resistance varies inversely to the intensity of light they receive (indicated by λ) are used for resistances 150, 152, and 154 in bridge 156. Points 158 and 160 correspond with points 31 and 33 of bridge 28 and are connected to an amplifier 162 which is in turn connected in series with a long time constant circuit 164, a light driver 166 and a light source 167. Impedance 168 is comparable to impedance 36 in FIG. 2 and is the impedance of probe 24. Imbalances in bridge 156 are detected between points 158 and 160 and are supplied via leads 170 and 172 to the bases of transistors 46 and 48 (in FIG. 2) respectively and via leads 174 and 176 to differential amplifier 162. Imbalances in bridge 156 are transmitted to amplifier 162 as a difference in voltage. Long time constant circuit 164 rejects all of the relatively high frequency signal variations but passes the relatively low frequency variations to light driver 166 which drives light source 167 such that impedances 150, 152 and 156 follow changes in impedance 168. For example, if a change in ambient humidity causes impedance 168 to increase gradually over a relatively long period of time, light driver 166 will cause light source 167 to dim such that impedances 150, 152 and 154 also increase in parallel. The converse occurs when impedance 168 decreases.

What is claimed is:

1. An apparatus for detecting the electrochemical response of a tissue to stimuli, comprising:
   sensor means electrically engaging said tissue for sensing the electrochemical condition thereof;
   detector means operatively connected to said sensor means for generating an electrical signal in response to changes in the electrochemical condition of said tissue as communicated by said sensor means;
   amplifier means arranged to receive said electrical signal and supply an amplified output signal proportional thereto; and
   output means arranged to receive said amplified electrical signal and generate an output in response thereto wherein said detector means comprises a bridge circuit connected to said sensor such that said electrodes and tissue form an impedance leg thereof and said amplifier means is connected thereacross such that an imbalance of aid bridge will appear as differential voltage at the input thereto and a long time constant circuit coupled between said amplifier and said output means for rejecting relatively high frequency signal components passing therethrough.

2. The apparatus of claim 1 wherein said sensor means comprises a pair of electrodes disposed in electrical contact with said tissue.

3. The apparatus of claim 1 further characterized by means arranged to automatically adjust said detector means to compensate for relatively low frequency changes in ambient conditions whereby maximum detector means sensitivity is maintained.

4. The apparatus of claim 3 wherein said output means comprises a visual display.

5. The apparatus of claim 4 wherein said visual display is a light source whose intensity varies in accordance with the electrochemical status of said tissue.

6. The apparatus of claim 3 wherein said output means comprises an audio system for generating an audible sound in response to electrochemical changes in the tissue.

7. The apparatus of claim 6 wherein said audio system comprises:
   an oscillator circuit arranged to oscillate with an audio frequency proportional to the output of said amplifier means;
   a power amplifier arranged to amplify the output of said oscillator; and speaker means connected to said power amplifier.

8. The apparatus of claim 7 further characterized by gate means disposed between said oscillator and power amplifier and communicable with said amplifier means so that variations in signal amplitude at said amplifier enable said gate means and allow the output of said oscillator to reach said power amplifier.

9. The apparatus of claim 8 further characterized by a light source connected to said amplifier means whereby both an audible and visual response are provided.

10. An apparatus for detecting the electrochemical response of a tissue to stimuli, comprising:
    sensor means electrically engaging said tissue for sensing the electrochemical condition thereof;
    detector means operatively connected to said sensor means for generating an electrical signal in response to changes in the electrochemical condition of said tissue as communicated by said sensor means;
    amplifier means arranged to receive said electrical signal and supply an amplified output signal proportional thereto; and
    output means arranged to receive said amplified electrical signal and generate an output in response thereto wherein said output means comprises oscillator means arranged to oscillate with an audio frequency proportional to the output of said amplifier means,
    audio transducing means responsive to the output from said output means and
    inhibit means responsive to lack of changes in the electrochemical condition of said tissue as communicated by said sensor to inhibit passage of the output from said oscillator means to said audio transducing means.

11. The apparatus of claim 10 wherein said detector means comprises a bridge circuit connected to said sensor such that said electrodes and tissue form an impedance leg thereof and said amplifier means is connected thereacross such that an imbalance of said bridge will appear as a differential voltage at the input thereof and a long time constant circuit coupled between said amplifier and said output means for rejecting relatively high frequency signal components passing therethrough.

* * * * *